United States Patent
Newman et al.

(10) Patent No.: US 8,550,339 B1
(45) Date of Patent: Oct. 8, 2013

(54) UTILIZATION OF DIGIT SEQUENCES FOR BIOMETRIC AUTHENTICATION

(75) Inventors: Kurt D. Newman, Matthews, NC (US);
Timothy J. Bendel, Charlotte, NC (US);
Rustam N. Wadia, Charlotte, NC (US);
Debashis Ghosh, Charlotte, NC (US);
David Joa, Pacifica, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/983,936

(22) Filed: Jan. 4, 2011

(51) Int. Cl.
| | |
|---|---|
| G06Q 40/00 | (2012.01) |
| G07D 11/00 | (2006.01) |
| G07F 19/00 | (2006.01) |
| G05B 19/00 | (2006.01) |
| G05B 23/00 | (2006.01) |
| G06F 7/00 | (2006.01) |
| G06F 7/04 | (2006.01) |
| G06K 19/00 | (2006.01) |
| G06K 9/00 | (2006.01) |
| G08B 5/00 | (2006.01) |
| G08B 13/00 | (2006.01) |
| G08B 19/00 | (2006.01) |
| G08B 21/00 | (2006.01) |
| G08B 23/00 | (2006.01) |
| G08B 25/00 | (2006.01) |
| G08B 29/00 | (2006.01) |
| G08C 19/00 | (2006.01) |
| H04B 1/00 | (2006.01) |
| H04B 3/00 | (2006.01) |
| H04L 9/14 | (2006.01) |
| H04L 9/32 | (2006.01) |
| H04Q 1/00 | (2006.01) |
| H04Q 9/00 | (2006.01) |

(52) U.S. Cl.
USPC ..... 235/379; 705/43; 902/3; 902/8; 340/5.41; 340/5.52; 340/5.82; 382/124

(58) Field of Classification Search
USPC ............... 235/382, 379, 380, 375; 340/5.52, 340/5.53, 5.82, 5.83, 539.13, 8.1; 382/115, 382/116, 124; 902/3; 345/173; 705/39, 705/43, 44
See application file for complete search history.

(56) References Cited

U.S. PATENT DOCUMENTS

| | | | |
|---|---|---|---|
| 5,933,515 A * | 8/1999 | Pu et al. | 382/124 |
| 6,229,906 B1 | 5/2001 | Pu et al. | |
| 6,373,967 B2 | 4/2002 | Pu et al. | |
| 6,393,139 B1 * | 5/2002 | Lin et al. | 382/124 |
| 6,651,168 B1 | 11/2003 | Kao et al. | |
| 6,944,773 B1 * | 9/2005 | Abrahams | 713/168 |
| 7,270,275 B1 | 9/2007 | Moreland et al. | |
| 7,360,248 B1 * | 4/2008 | Kanevsky et al. | 726/21 |

(Continued)

FOREIGN PATENT DOCUMENTS

CN 2694364 4/2005

*Primary Examiner* — Michael G Lee
*Assistant Examiner* — Suezu Ellis
(74) *Attorney, Agent, or Firm* — Weiss & Arons LLP; Michael Springs

(57) ABSTRACT

Systems and methods for implementing a sequence of fingerprints for biometric authentication are provided. A sequence of fingerprints is more difficult to fraudulently circumvent than a single finger or thumb print. A sequence of fingerprints takes advantage of inexpensive fingerprint scanners and easily available fingerprints. A sequence of fingerprints may be used in conjunction with additional biometric authentications and/or confidential access sequences. The sequence of fingerprints may include prints of the digits of the foot. The sequence of fingerprints for biometric authentication may be system or user defined.

15 Claims, 5 Drawing Sheets

(56) References Cited

U.S. PATENT DOCUMENTS

| | | |
|---|---|---|
| 7,362,973 B1 | 4/2008 | Dickson et al. |
| 7,451,116 B2 * | 11/2008 | Parmelee et al. ............... 705/50 |
| 7,486,810 B1 | 2/2009 | Accapadi |
| 2001/0043726 A1 * | 11/2001 | Ikebata et al. ................ 382/116 |
| 2001/0049785 A1 * | 12/2001 | Kawan et al. ................. 713/156 |
| 2003/0135764 A1 | 7/2003 | Lu |
| 2004/0151353 A1 | 8/2004 | Topping |
| 2005/0111709 A1 * | 5/2005 | Topping ........................ 382/124 |
| 2006/0104486 A1 * | 5/2006 | Le Saint et al. ............... 382/115 |
| 2006/0224645 A1 * | 10/2006 | Kadi ............................. 708/200 |
| 2007/0140530 A1 * | 6/2007 | Coogan et al. ................ 382/115 |
| 2008/0072331 A1 | 3/2008 | Dickson et al. |
| 2008/0169944 A1 | 7/2008 | Howarth et al. |
| 2008/0226146 A1 * | 9/2008 | Niklan ......................... 382/128 |
| 2009/0326732 A1 | 12/2009 | Dickson et al. |
| 2010/0027045 A1 * | 2/2010 | Moore ........................ 358/1.14 |
| 2010/0059587 A1 * | 3/2010 | Miller et al. .................. 235/379 |
| 2011/0156865 A1 * | 6/2011 | Baek et al. ................... 340/5.53 |

* cited by examiner

UTILIZATION OF DIGIT SEQUENCES FOR BIOMETRIC AUTHENTICATION

FIELD OF TECHNOLOGY

Aspects of the invention relate to a sequence of fingerprints for biometric authentication.

BACKGROUND

As remote access to confidential data and secure systems has become increasingly common, there has been corresponding need for secure authentication before permitting access to the confidential data. Biometrics is one type of authentication that is accurate and thought to be secure. Biometrics uniquely associates physiological or behavioral characteristics with an individual. Examples include fingerprints, iris recognition, palm prints and DNA. Biometric authentications have an advantage over password based authentications that a user does not need to remember a password, or worry about losing an access card.

In recent years technology implementing fingerprint scanning has become cheap and accurate. Additionally, fingerprints in particular are a convenient type of authentication because people usually have their fingers available and accessible. However, despite the attractiveness of fingerprint scanning, there are some disadvantages.

Fingerprints may be damaged and some do not have fingers or fingerprints. Another problem is that in using their hands and fingers throughout the day, people leave fingerprints on many objects in many different places. Thus, fingerprints are not inherently private.

For example, a fingerprint scanner has been fooled by latex fingers that were molded to produce a copy of a fingerprint. Some fingerprint scanners have been fooled to authenticate fingerprints that were lifted from surfaces using laser printer toner and then reproduced on a copy machine.

Additionally, biometrics in general have a disadvantage that they are static. Once a unique biometric characteristic has been compromised, the biometric characteristic cannot be easily changed. For example, if a fingerprint is stolen or fraudulently obtained, it would be difficult, and perhaps impossible for the user to replace or change the stolen fingerprint.

In contrast, if access to confidential data or a secure system is protected by a password, if the password has been compromised, a user may easily change the password. Furthermore, a user may mitigate the risk of password disclosure by using different passwords for different applications. However, regarding fingerprints a typical user only has ten.

It would be desirable to provide an authentication that would have the advantages of using fingerprints as a biometric authentication, but at the same time limit the disadvantages of using fingerprints.

SUMMARY OF THE INVENTION

It is an object of this invention to provide a more secure fingerprint biometric authentication that is more difficult to be fraudulently circumvented.

It is a further object of this invention to implement a sequence of fingerprints for biometric authentication that is more difficult to be fraudulently circumvented.

BRIEF DESCRIPTION OF THE DRAWINGS

The objects and advantages of the current invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
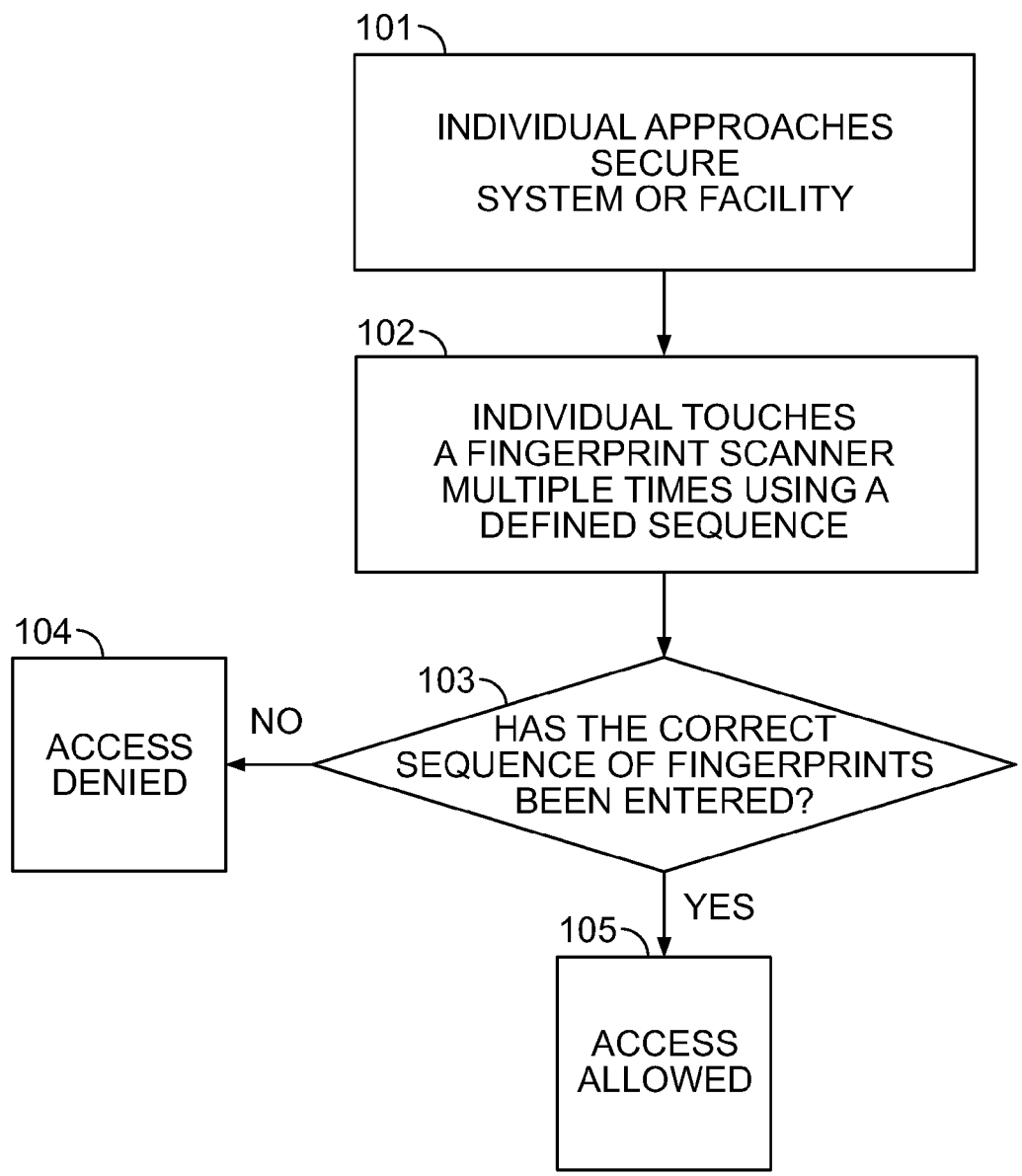
FIG. 1 shows an illustrative flow diagram of steps for a sequence of fingerprints for biometric authentication.

Systems and methods for providing a sequence of fingerprints for biometric authentication is provided. Systems and methods according to the invention preferably increase the difficulty of circumventing an individual's biometric fingerprint information. Thus, access to a secure system or facility will be protected by a sequence of fingerprints that is more secure than access protected by a single fingerprint.

Systems and methods according to the invention preferably provide a sequence of fingerprints for authentication instead of a single finger or thumb print. The sequence of fingerprints may be selected by a user or system defined.

For example, the following sequence may be defined by a user and required for authentication: $1^{st}$ finger, $3^{rd}$ finger, $4^{th}$ finger, thumb.

A fingerprint sequence may have a variable length and may include sequential repetitions of the same finger. For example, sequence of fingerprints may be: $1^{st}$ finger, $1^{st}$ finger, $3^{rd}$ finger, $1^{st}$ finger.

A user may combine different fingers of the right and left hands. In some embodiments, a user may combine the prints of digits of the right and left feet.

One may be able to fraudulently obtain copies of individual fingerprints and fool systems known to require a specific fingerprint for authentication. However, using a sequence of fingerprints for authentication will require not only possession of an individual's fingerprints but also knowledge of the sequence with which to use the fingerprints.

Fingerprint scanners are inexpensive devices that may be used for biometric authentication. Additionally, a sequence of fingerprints for biometric authentication may be changed, yet maintains the advantage of always being carried with a user. Furthermore, a sequence of fingerprints is much more difficult to fraudulently circumvent than a single fingerprint.

A sequence of fingerprints may be considered a "two factor authentication." The sequence of fingerprints requires a unique biometric characteristic, namely fingerprints, and a unique sequence of using the fingerprints. The sequence of fingerprints may be required to be entered in a specific order, or the required fingerprints may be entered in any order.

In some embodiments the sequence of fingerprints may itself be used as an access code for authenticating users to access a secure system or facility. For example, mobile devices are increasingly being used to make online purchases and a fingerprint reader may be incorporated into a mobile device. In some embodiments, to ensure that the one making the online purchase is the authorized user of the mobile device, a purchaser may be required to enter a sequence of fingerprints.

In some embodiments, the sequence of fingerprints may be used in conjunction with another biometric characteristic. For example, an iris scanner may used in conjunction with a sequence of fingerprints. In some embodiments, a camera built into a mobile device may be used as an iris scanner, and authentication may require a sequence of fingerprints and an iris scan.

In some embodiments, the sequence of fingerprints may be used in conjunction with a dynamic presentation of inputs available for selection, as described in co-pending, commonly-assigned U.S. patent application Ser. Nos. 12/983,929, entitled "Dynamic Touch Screen for ATMs" and 12/825,522, entitled "ATMs with Glare Reduction", respectively, and incorporated by reference heroin in their respective entireties. For example, in some embodiments, the sequence of fingerprints may be used to confirm the identity of a user who has previously entered or will be prompted to enter an additional access code.

In some embodiments, a user may be required to select a particular input displayed by touching a displayed input with a particular finger. A fingerprint scanner may be incorporated into the device for use in confirming authorized selection of a presented input. The finger required to select an input may be randomly chosen or may be user-defined. Instructions may be displayed informing the user which finger to use for selecting a particular input.

In some embodiments, a sequence of fingerprints may be used in addition to a entering a password. In some embodiments, entry of the password and/or displayed inputs may be further secured by a dynamic layout of inputs, as described in "Dynamic Touch Screen for ATMs."

In some embodiments, a GPS device may detect the presence of a user in close proximity to a secured facility, and a sequence of fingerprints may authenticate the individual in possession of the GPS device before access to the secured facility is authorized. In some embodiments, a GPS device and a sequence of fingerprints may be incorporated into a mobile device.

As will be appreciated by one skilled in the art, systems and methods according to the invention may be applicable to different areas. Systems and methods according to the invention may be applied in any area that requires authorization to access secure systems or facilities. Some embodiments include transactions at ATM machines, banking transactions performed by a human teller, mobile payments using cellular phones, online payments entered using a computer, access to computer systems, a pre-paid phone booth, or anywhere confidential sequences are required to gain access to restricted resources.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Processes in accordance with the principles of the invention may include one or more features of the process illustrated in FIG. 1. For the sake of illustration, the steps of the process illustrated in FIG. 1 will be described as being performed by a "system". The "system" may include one or more of the features of the apparatus that are shown in FIGS. 2-5 and/or any other suitable device or approach. The "system" may be provided by an entity. The entity may be an individual, an organization or any other suitable entity.

FIG. 1 shows illustrative steps that may be performed by some embodiments of the invention. For the purpose of illustration the steps will be described as being performed by or on a system in accordance with the principles of the invention.

At step 101 an individual approaches a secured system or facility. Preferably only authorized individuals are allowed access to the secured system or facility. At step 102 the individual touches a fingerprint scanner multiple times with a defined sequence of fingerprints. The sequence of fingerprints may be chosen by the individual or may be chosen by the system.

At step 103 the system compares the sequence entered by the individual to the sequence required for authorization. At step 105 if the sequence entered matches the sequence required for authentication, access to the secure system or facility is allowed. At step 104, if the sequence of fingerprints entered by the individual does not match the sequence of fingerprints required for authentication, access to the secure system or facility will be denied.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 2:
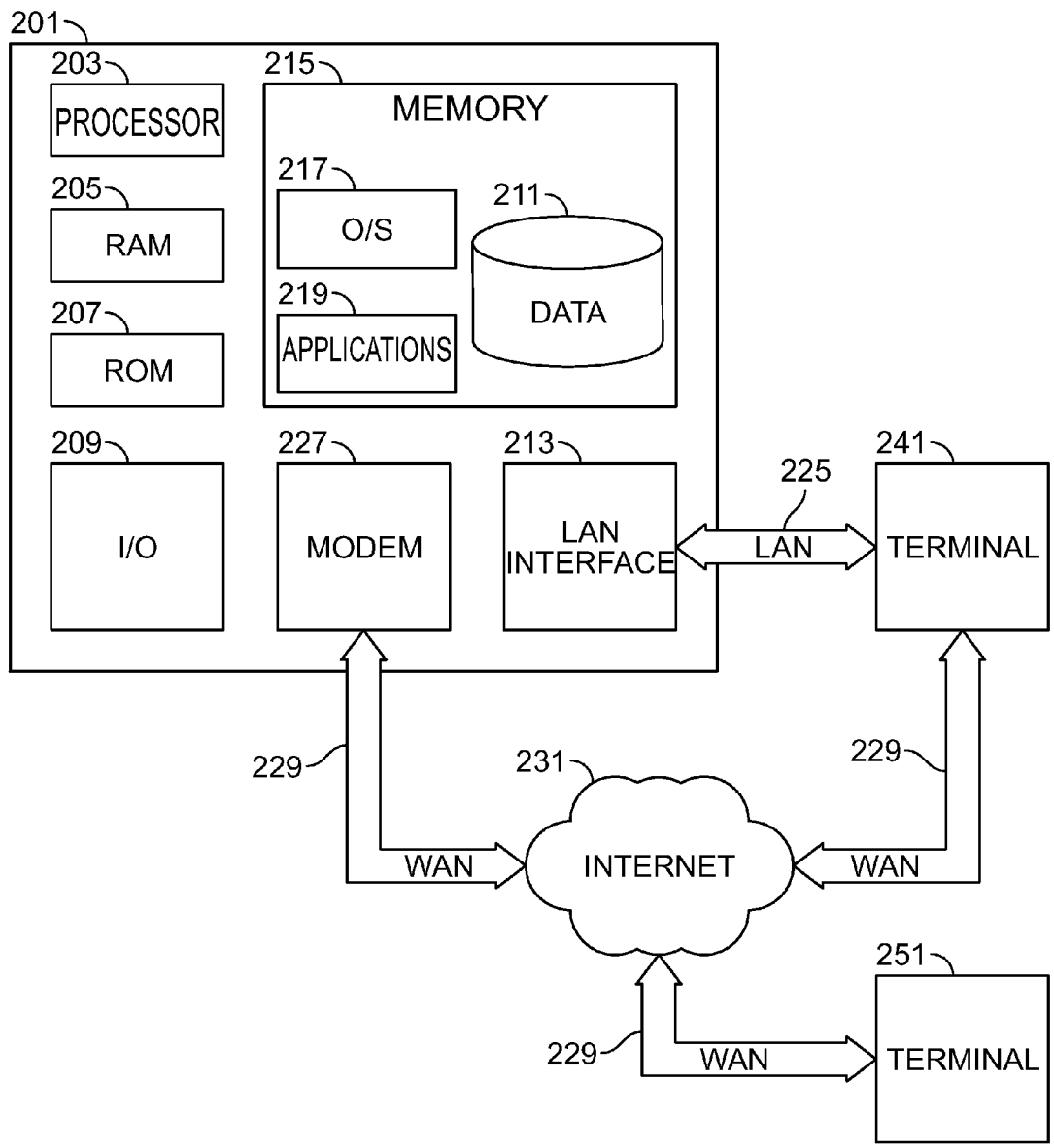
FIG. 2 shows a schematic diagram of a general purpose digital computing environment in which one or more aspects of the present invention may be implemented.

FIG. 2 illustrates a block diagram of a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 215.

I/O module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 221. Alternatively, some or all of server 201 computer executable instructions may be embodied in hardware or firmware (not shown). Database 221 may provide centralized storage of biometric characteristics associated with a particular user.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a LAN interface 213. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219 used by server 201 according to an illustrative embodiment of the invention may include computer executable instructions for invoking user functionality related to fingerprint recognition and/or voice input and speech recognition applications.

Computing device 201 and/or terminals 241 or 251 may also be mobile terminals including various other components, such as a battery, speaker, and antennas (not shown).

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 3:
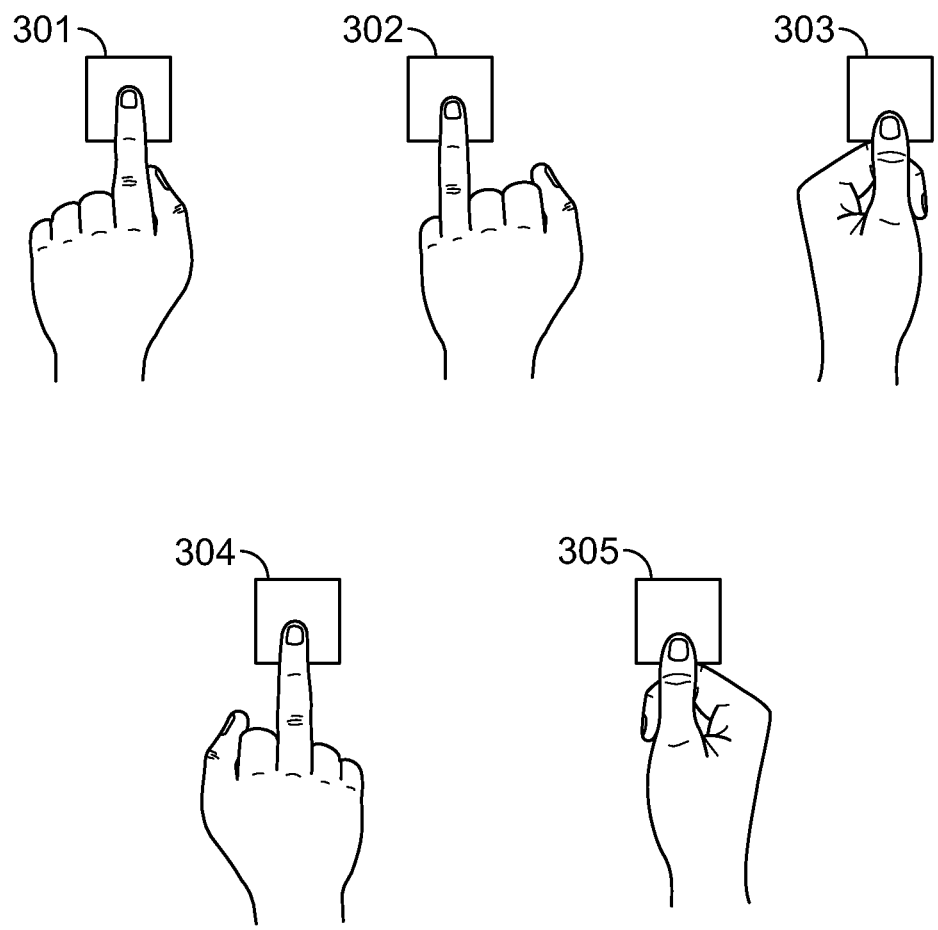
FIG. 3 shows an illustrative sequence of fingerprints for biometric authentication.

FIG. 3 shows an illustrative sequence of fingerprints for biometric authentication. In the illustrated embodiments, an individual scans specific fingerprints in a specific order to confirm identity and to obtain authorization. 301 shows that the first finger of the left hand is scanned first. 302 shows the third finger of the left hand is scanned second. 303 shows the left thumb is scanned third. 304 shows the second finger of the right hand is scanned fourth. 305 shows the second finger of the right hand is scanned fifth. Upon successful completion of the aforementioned sequence of fingerprints, access to a secure system or facility will be allowed.

Figure 4:
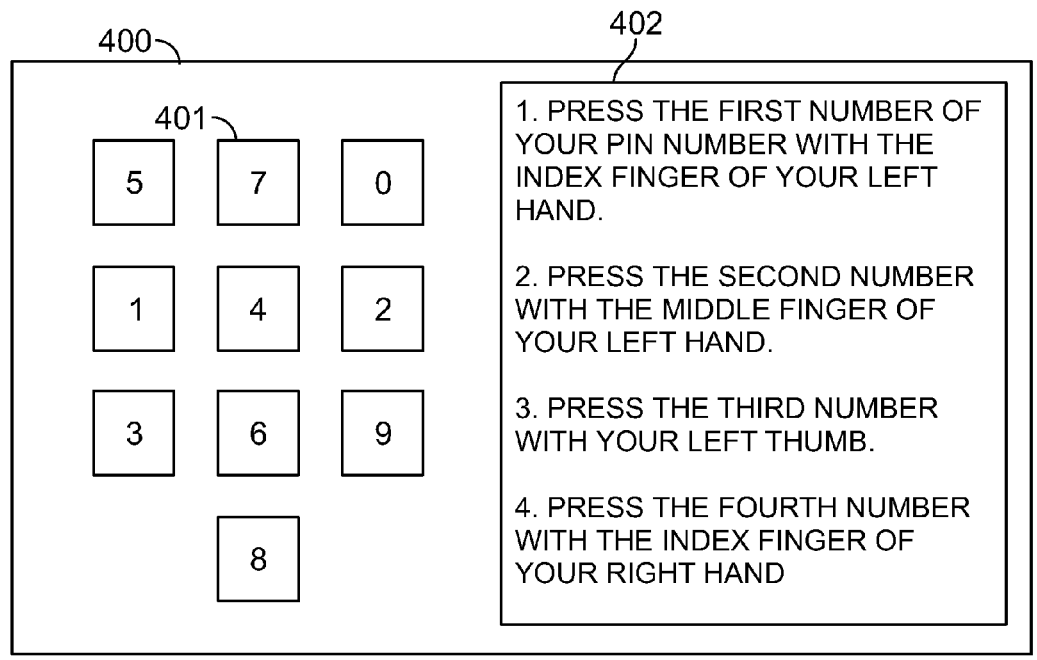
FIG. 4 shows an illustrative sequence of fingerprints for biometric authentication in conjunction with a dynamic display of inputs available for selection.

FIG. 4 shows an illustrative sequence of fingerprints for biometric authentication to be used in conjunction with a requirement that a displayed input be selected using a particular finger. The method of selecting an input may incorporate a fingerprint scanner (not shown).

In FIG. 4, the inputs available for selection are displayed on touch screen 400. The touch screen in addition to detecting selection of an input 401, may include a fingerprint scanner (not shown). FIG. 4 includes instructions 402 directing a user to use a specific finger to select a specific input.

Figure 5:
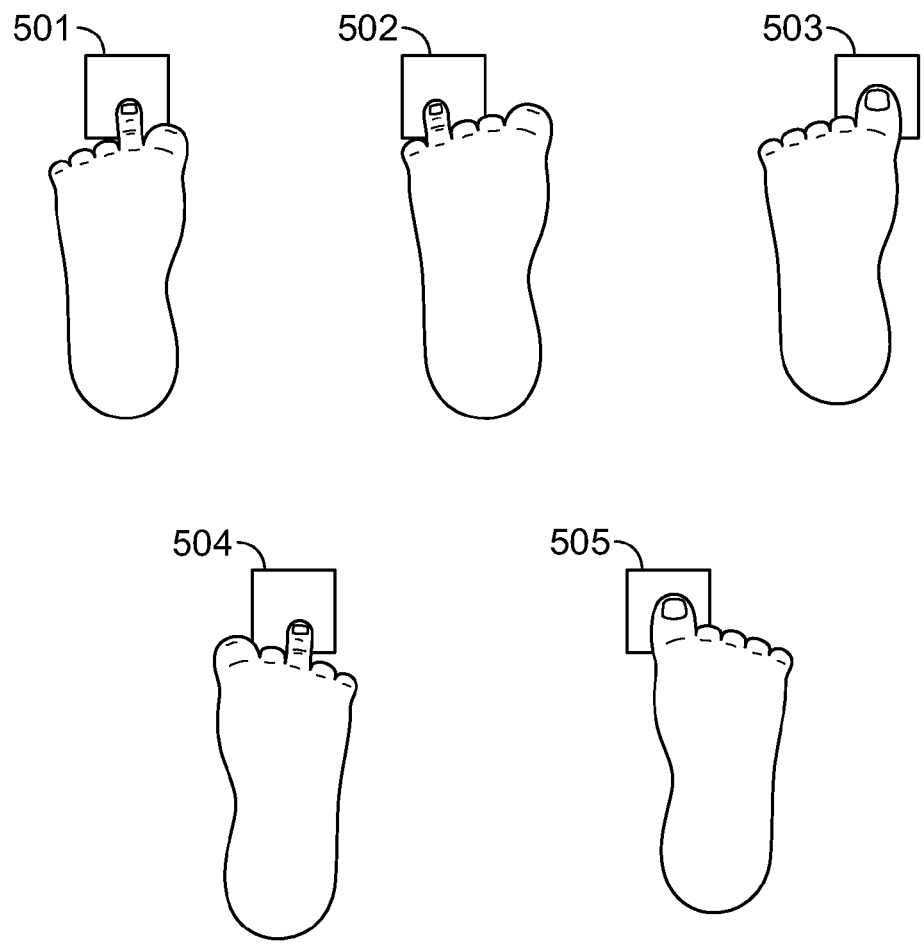
FIG. 5 shows an illustrative sequence of prints of the digits of the foot for biometric authentication.

FIG. 5 shows an illustrative sequence of prints of digits of the foot for biometric authentication.

Thus, systems and methods implementing a sequence of fingerprints for biometric authentication have been provided. Persons skilled in the art will appreciate that the present invention can be practiced by other than the described embodiments, which are presented for purposes of illustration rather than of limitation. The present invention is limited only by the claims that follow.

What is claimed is:

1. A system for implementing a sequence of fingerprints for biometric authentication comprising:
    a fingerprint scanner;
    a Global Positioning System ("GPS") input to verify presence of a user in close proximity to an Automated Teller Machine ("ATM") location;
    a machine readable memory configured to store machine executable instructions for receiving, user input of a sequence of at least two fingerprints;
    an input/output device for displaying or communicating by an audio signal, instructions to input a first fingerprint by touching an input prompt on a dynamic touch screen, followed by instructions to input a second, different fingerprint by touching the input prompt on the dynamic touch screen, wherein the input prompt shifts position on the touch screen after the first fingerprint input is entered; and
    a processor device configured to execute the machine executable instructions for receiving user input of the sequence of at least two fingerprints and to execute machine executable instructions for receiving the GPS input.

2. The system of claim 1 wherein the sequence of fingerprints is defined by a user.

3. The system of claim 1 wherein the sequence of fingerprints is defined by a system.

4. The system of claim 1 wherein the sequence of fingerprints is system defined by machine executable instructions.

5. The system of claim 4 wherein the sequence of fingerprints for biometric authentication is randomly chosen.

6. The media of claim 1 wherein the dynamic touch screen input prompts display numerals out of sequence.

7. The media of claim 1 wherein the dynamic touch screen input prompts appear at the edge of the touch screen.

8. A method for implementing a sequence of two or more different fingerprints for biometric authentication, the method comprising:
    displaying or communicating by an audio signal, instructions to input a first fingerprint by touching an input prompt on a dynamic touch screen, followed by instructions to input a second, different fingerprint by touching the input prompt on the dynamic touch screen, wherein the input prompt shifts position on the touch screen after the first fingerprint input is entered; and using a fingerprint scanner to input a sequence of at least two different fingerprints;

using a GPS input to verify presence of a user in close proximity to an ATM location;

using a machine readable memory configured to store machine executable instructions for receiving user input of a sequence of at least two different fingerprints; and using a processor device to execute machine executable instructions for receiving user input of the sequence of at least two fingerprints and for receiving the GPS input.

9. The method of claim 8, further comprising using a receiver to receive a user's input definition of a sequence of at least two different fingerprints for biometric authentication.

10. The method of claim 8, using the processor device to define a sequence of fingerprints for biometric authentication.

11. The method of claim 8, using the processor device to define a randomly-defined sequence of at least two different fingerprints for biometric authentication.

12. One or more non-transitory computer-readable media storing computer-executable instructions that, when executed by a processor on a computer system, perform a method for implementing a sequence of fingerprints for biometric authentication, the method comprising:

an input/output device for displaying or communicating by an audio signal, instructions to input a first fingerprint by touching an input prompt on a dynamic, touch screen, followed by instructions to input a second, different fingerprint by touching the input prompt on the dynamic touch screen, wherein the input prompt shifts position on the touch screen after the first fingerprint input is entered;

using a fingerprint scanner to input a sequence of at least two different fingerprints;

using a GPS input to verify presence of a user in close proximity to an ATM location;

using a machine readable memory configured to store machine executable instructions for receiving user input of a sequence of at least two different fingerprints;

using a processor device to execute machine executable instructions for receiving user input of the sequence of at least two different fingerprints.

13. The method of claim 12, further comprising using a receiver to receive a user's input definition of a sequence of at least two different fingerprints for biometric identification.

14. The method of claim 12, using the processor device to define a sequence of at least two different fingerprints.

15. The method of claim 12, using the processor device to define a randomly-defined sequence of at least two different fingerprints for biometric authentication.

\* \* \* \* \*